United States Patent [19]

Smith

[11] Patent Number: 5,165,186
[45] Date of Patent: Nov. 24, 1992

[54] SIGN READABLE AT SPEED

[75] Inventor: Edwin J. Smith, Allestree, United Kingdom

[73] Assignee: Cassel-Smith Limited, Allestree, United Kingdom

[21] Appl. No.: 571,634

[22] PCT Filed: Feb. 24, 1989

[86] PCT No.: PCT/GB89/00195

§ 371 Date: Aug. 31, 1990

§ 102(e) Date: Aug. 31, 1990

[87] PCT Pub. No.: WO89/08304

PCT Pub. Date: Sep. 8, 1989

[30] Foreign Application Priority Data

Mar. 2, 1988 [GB] United Kingdom ............ 8804911

[51] Int. Cl.$^5$ ............................................. G09F 19/12
[52] U.S. Cl. ........................................... 40/427; 40/454; 352/58; 352/81
[58] Field of Search ............... 40/454, 427; 350/167; 352/43; 354/112, 115, 10; 359/623, 622

[56] References Cited

U.S. PATENT DOCUMENTS

| | | | |
|---|---|---|---|
| 2,067,843 | 1/1937 | Tönnies | 350/167 |
| 2,833,176 | 5/1958 | Ossoinak | 40/454 |
| 3,225,651 | 12/1965 | Clay | 350/167 |
| 3,225,672 | 12/1965 | Clay | 354/112 |
| 3,244,071 | 4/1966 | Gumpertz | 350/167 |
| 3,330,614 | 7/1967 | Cullis, Jr. | 350/167 |
| 3,463,581 | 8/1969 | Clay | 352/43 |
| 3,568,346 | 3/1971 | Smith | 40/454 |
| 3,592,529 | 7/1971 | Juhlin, Jr. | 350/167 |
| 3,712,727 | 1/1973 | Bonnet | 350/167 |
| 4,117,615 | 10/1978 | Gomolak | 40/454 |
| 4,145,131 | 3/1979 | Yevick | 350/167 |
| 4,542,958 | 9/1985 | Young | 40/454 |
| 4,867,514 | 9/1989 | Waldron | 350/167 |

FOREIGN PATENT DOCUMENTS 2149527 6/1985 United Kingdom .

Primary Examiner—Kenneth J. Dorner
Assistant Examiner—Cassandra Hope
Attorney, Agent, or Firm—Harenss, Dickey & Pierce

[57] ABSTRACT

A sign having an array of elements each comprising a first lens, a second lens and an optical object in registry with the first and second lenses such that the virtual image of the optical object formed in the second lens lies in the focal surface of the first lens. The optical objects are a representation of the information which the sign is to present. The image of the optical objects seen by a viewer moving past the sign appears to be stationary with respect to the viewer.

10 Claims, 7 Drawing Sheets

SIGN READABLE AT SPEED

BACKGROUND

The present invention relates to a sign readable at speed and is concerned with such a sign which, for example, is suitable for location by the side of a railway track for presenting information to a viewer of the sign travelling along the track.

U.S. Pat. Specification No. 3,568,346 discloses an optical sign of this type in which the functional assembly of the sign comprises an array of hexagonal or rectangular spherical biconvex lenses of positive power, and a corresponding tessellated array of identical optical objects, each object being disposed in the focal plane of the corresponding lens and being a representation of the information which the sign is to present. However the use of spherical biconvex lenses is disadvantageous due to spheric aberrations.

In order to reduce spheric aberrations British Patent Specification No. 2,149,527 provides an optical sign comprising hexagonal or rectangular lenses which are aspheric and optionally may be of the equivalent fresnel design. The optical object corresponding to each lens is disposed on a hexagonal sheet that conforms to the contour of the focal surface of the lens and is concave with respect to the front of the sign.

However providing the optical object on a surface which conforms to the focal surface of the aspheric lens is difficult.

SUMMARY OF THE INVENTION

Accordingly the present invention provides a sign for presenting information to an observer moving with respect thereto, characterised in that the sign comprises a plurality of elements linearly disposed with respect to one another, each of which elements comprises first and second coaxial lenses and a planar optical object consisting of a representation of the information which the sign is to present and in registry with said first and second lenses, the optical object of each element being substantially identical and said first lens constituting the external surface of the sign, wherein the virtual image of the planar optical object formed by said second lens of each element lies in the focal surface of the first lens of the element such that light rays emanating from any point on the optical object through the second lens emerge in a substantially parallel manner from the first lens.

By "substantially identical" optical objects there is meant identical optical objects or optical objects which differ cinematically from one another so that an animated image is presented to the moving viewer.

In a first embodiment of the invention the first lenses are aspheric and the second lenses are plano-concave lenses wherein the plane surfaces of the plano-concave lenses are most remote from said first lenses and the optical objects lie directly against said plane surfaces of said lenses.

In a second embodiment of the invention the first lenses are aspheric and the second lenses are fresnel lenses of negative power in which the fresnel grooves are formed in the surface nearer to the first lenses, the objects being mounted at a fixed distance from the second lenses, in the direction away from the first lenses.

In a third embodiment of the invention the first lenses are surrounded by an opaque diaphragm, defining apertures which are coaxial with the lenses, such that the functional area of the lens is reduced. Where the first lenses are hexagonal aspheric lenses, the diaphragm may define hexagonal apertures, which apertures may be displaced by 30°, with respect to their associated lens, about their common axis. The functional area of the lens may be reduced such that it corresponds with the area of the aperture.

In a fourth embodiment of the invention, the first lenses may comprise fresnel lenses.

BRIEF DESCRIPTION OF THE DRAWINGS

For a better understanding of the invention, and to show how the same may be carried into effect, reference will now be made, by way of example, to the accompanying drawings in which.

DESCRIPTION OF THE PREFERRED EMBODIMENTS

Figure 1:
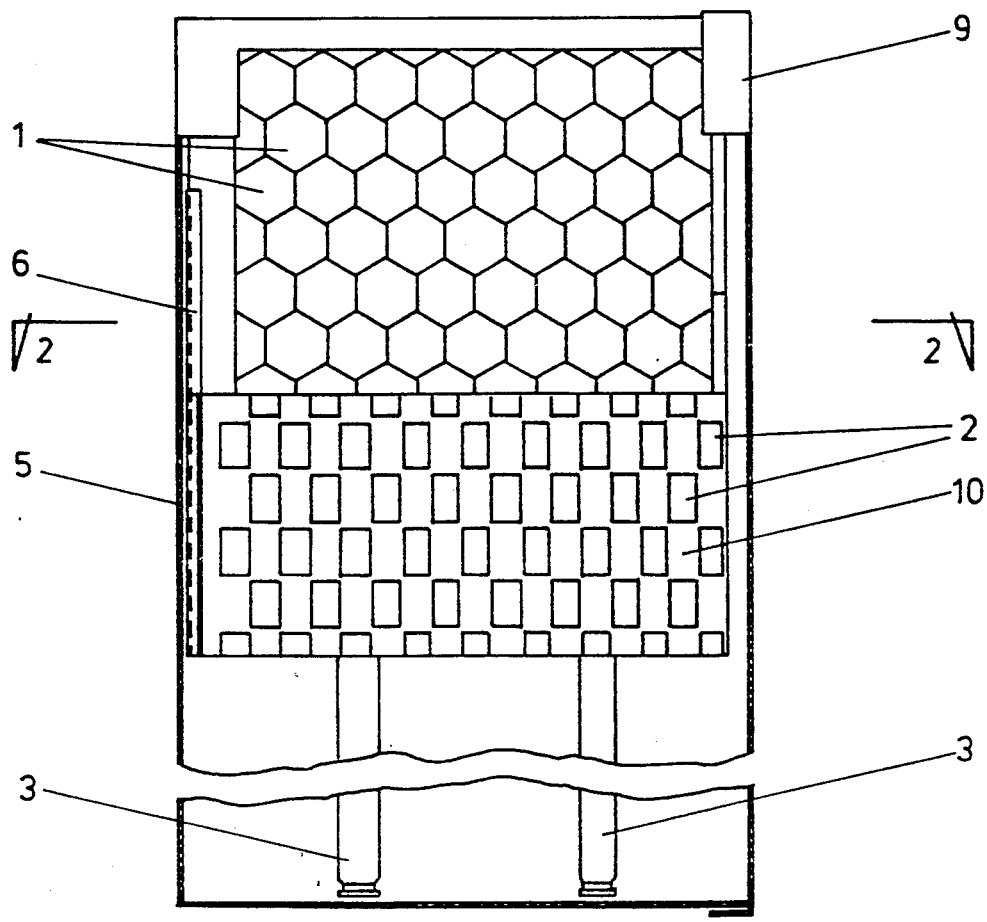
FIG. 1 is a partially sectioned front view of one type of known optical sign.
Figure 2:
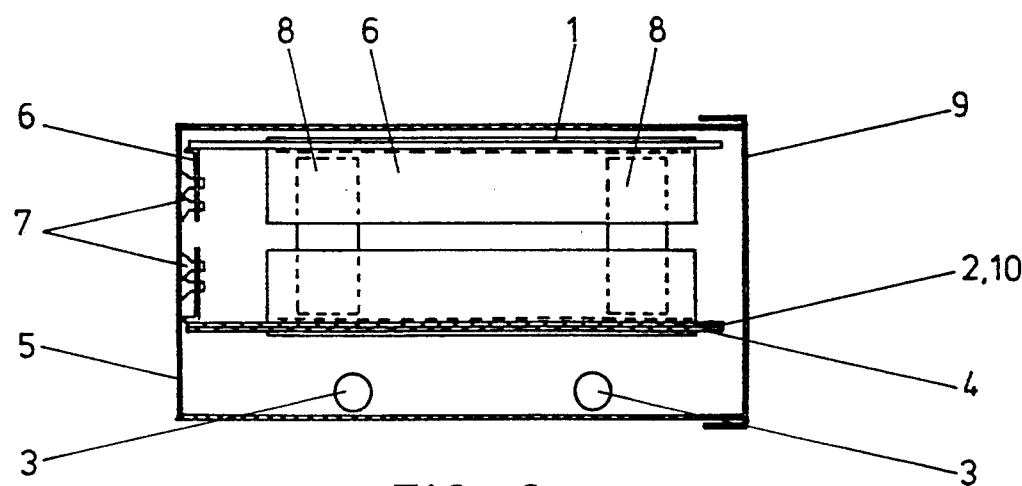
FIG. 2 is a sectional view taken along line 2—2 of the sign of FIG. 1.

In the various Figures, corresponding parts are denoted by like reference numerals Referring to FIGS. 1 and 2 there is shown an optical sign as disclosed in U.S. Pat. No. 3,568,346. The sign contains light sources 3 and a light diffuser 4 which uniformly illuminate the functional assembly forming the front of the sign. The sign comprises a tessellated array of hexagonal spherical biconvex lenses 1 of positive power, and a corresponding tessellated array of identical optical objects 2, each object 2 being disposed in the focal plane of its corresponding lens. The lenses and objects 2 are each arranged in contiguous columns, adjacent columns being vertically offset as shown in FIG. 1. The objects 2 are printed on a flat transparent sheet 10 so as to be illuminated by the light sources 3 via the diffuser 4 on which the object sheet 10 is mounted. The areas of the object sheet which surround the optical objects are opaque.

The lens-object pairs are separated from one another by opaque hexagonal partitioning (not shown) resembling a honeycomb. The partitioning divides the sign into an array of elements, each element being bounded by a lens 1, its corresponding object 2 and the adjacent partitioning. The lens array, partitioning, object sheet 10 and diffuser 4 are supported and held in alignment within the box 5 by supports 6. The top of the box 5 is closed by lid 9. The supports 6 are screwed to anchor nuts 7 which in turn are attached to plates 8 welded to the bottom and sides of the box 5.

The single image seen by a viewer positioned in front of the sign is identical to each of the duplicated objects, appears to be large and distant, and is stationary relative to the viewer, that is it moves with the viewer, irrespective of his movements in relation to the sign.

The columns of optical objects may be arranged in groups, the groups differing cinematically so that an animated image is presented to a transversal moving viewer.

Figure 3:
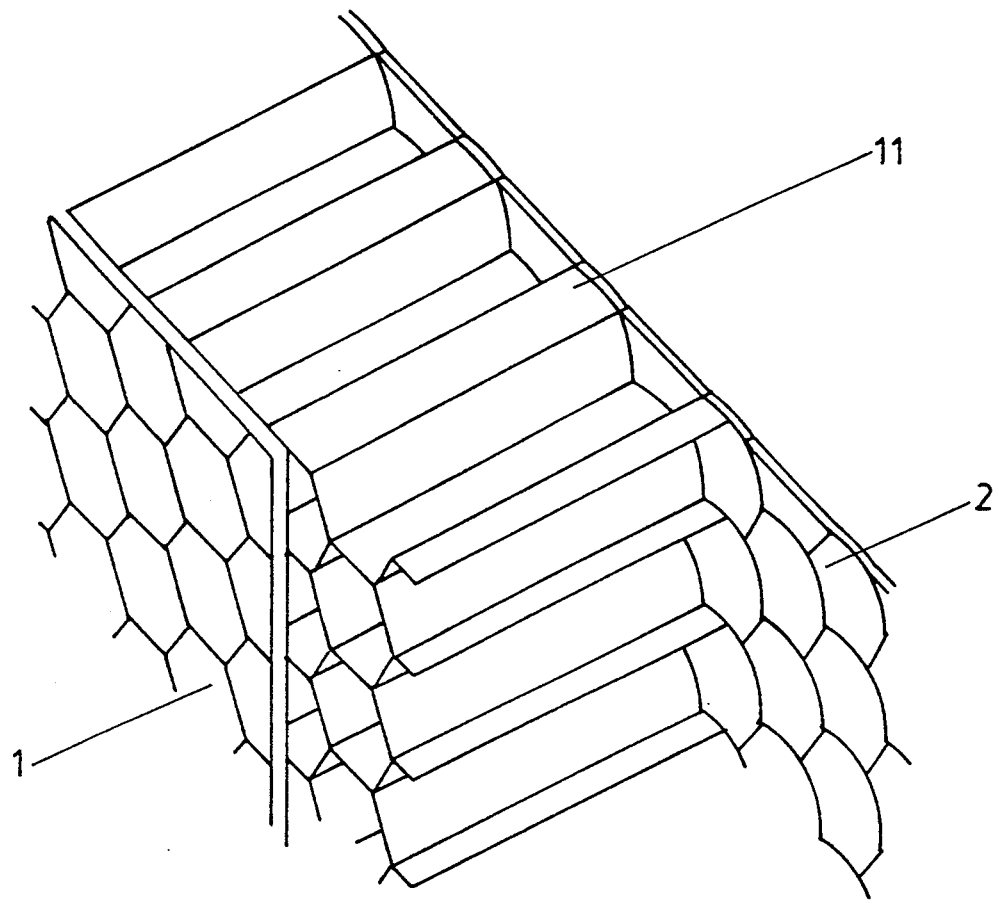
FIG. 3 is a perspective view of a part of another type of known optical sign.

In FIG. 3 is shown a cutaway view of the sign of GB 2,149,527, in which hexagonal lenses 1 are aspheric and optionally of the equivalent fresnel design. The optical object 2 corresponding to each lens 1 is disposed on a hexagonal sheet that conforms to the contour of the focal surface of the lens and is concave with respect to the front of the sign. The concave sheets tessellate to form a continuous sheet. The lens-optical object pairs are separated by opaque partitioning 11.

Figure 4:
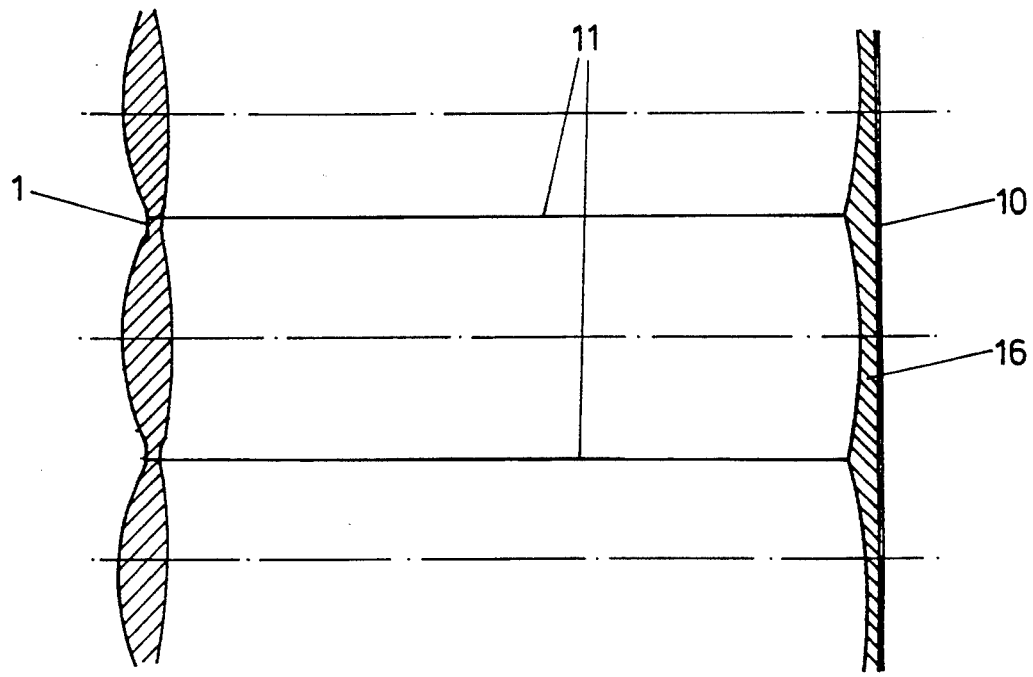
FIG. 4 is a section through a first sign in accordance with the present invention.

Referring to FIG. 4, there is shown a sign according to the invention which sign comprises an array of planoconcave second lenses 16, each disposed coaxially with the first lens 1 of its element and with its plane surface towards the back of the element. Each optical object (not shown) is printed on flat transparent object sheet 10 mounted directly on the plane surface of the plano-concave lenses. The function of the lenses 16 is to correct for curvature of the focal surfaces of first lenses 1. Each assembly of lens 16 and optical object is positioned coaxially in relation to the aspheric first lens 1, such that the virtual image of the object produced by lens 16 lies on the focal surface of lens 1. Thus rays passing through any point on any one of the co-planar objects constituting the information presented by the sign, and also passing through the aspheric first lens 1, emerge parallel within acceptable limits. Since the axes of the other identical elements forming the array are parallel, the rays from all points on the corresponding optical objects emerge parallel giving the illusion of an image at infinity, that is, beyond the discriminatory power of binocular stereoptic vision. Thus, the information presented by the sign appears to be stationary to a viewer moving past the sign. The sign includes a light source (not shown) similar to source 3 of FIGS. 1 and 2.

Figure 5:
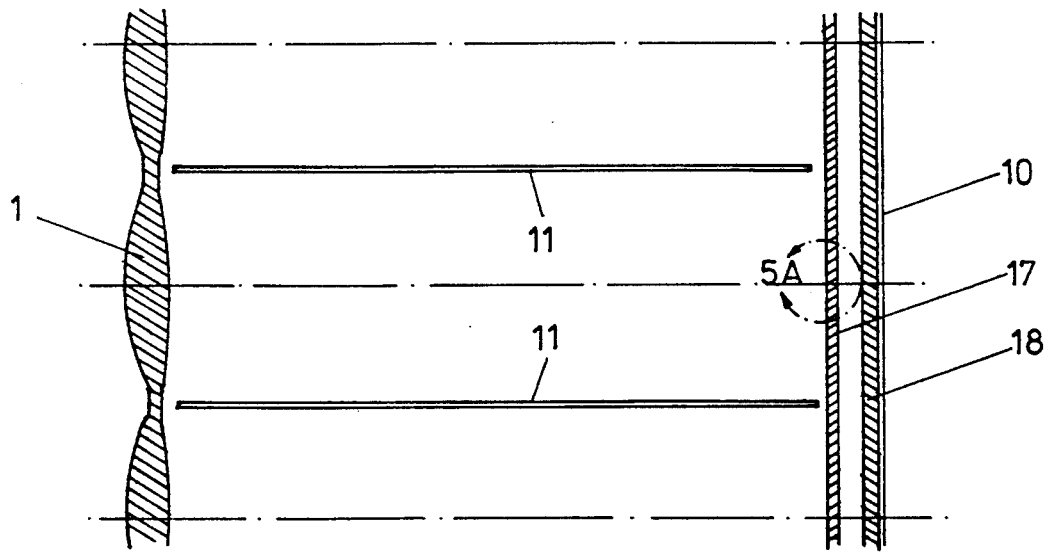
FIG. 5 is a section through a second sign in accordance with the present invention.

FIG. 5 shows another embodiment of the invention wherein each element includes a second lens in the form of a fresnel lens of negative power 17, having the fresnel grooves formed in its front surface, that is, the surface nearer to the first lens 1. The object sheet 10 is mounted on a separate transparent object sheet support 18 set at a fixed distance from the negative fresnel lenses 17. The powers of the first and second lenses of each element and the axial positions of the lenses and the optical objects on sheet 10 are such that rays passing through any point on any one of the co-planar objects constituting the legend, and also passing through the negative fresnel lens 17 and the aspheric first lens 1, emerge parallel. Again the sign includes a light source (not shown).

Figure 6:
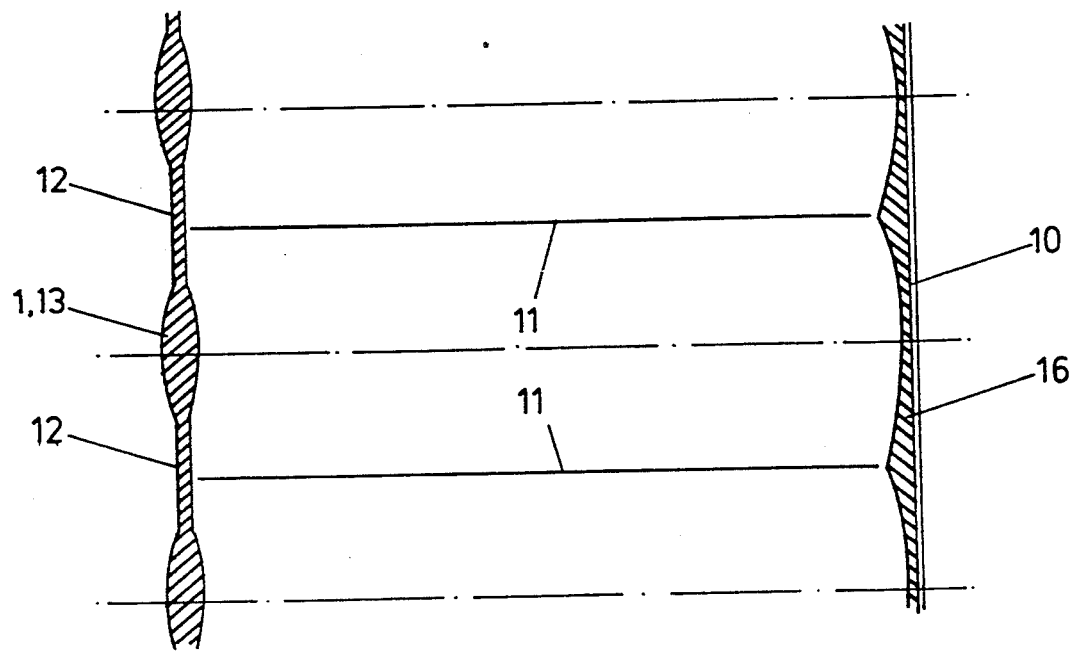
FIG. 6 is a section through a third sign in accordance with the present invention.
Figure 7:
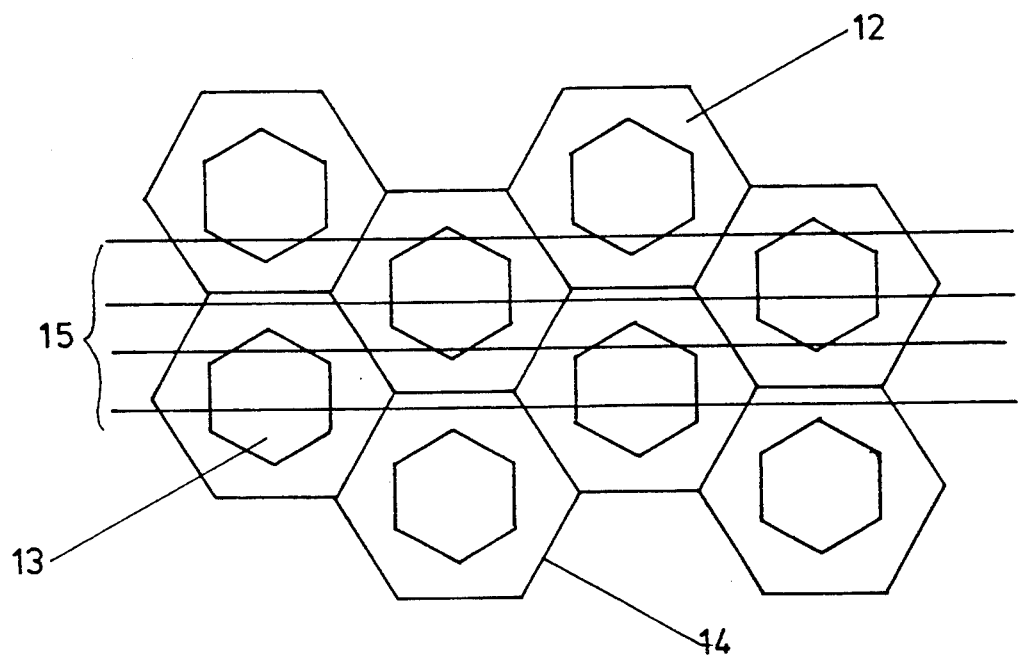
FIG. 7 is a front view of the sign of FIG. 6.

FIGS. 6 and 7 show a modification of the embodiment of FIG. 4 wherein the front of each element is covered by an opaque diaphragm 12 which reduces the effective area of the first lenses 1. The lenses 1 can be reduced in area so that their functional area corresponds to the area of the apertures. The diaphragm 12 comprises an opaque sheet, mounted on the front surface of the lenses 1 in which is formed a series of apertures 13. Each aperture 13 is hexagonal, concentric with its element's axis and rotated about its axis through 30 degrees with respect to boundary 14 of its first lens.

The shape and proportions of the diaphragm 12 are such that when the array of elements is considered as a whole, horizontal lines 15 drawn across the face of the sign coincide with the apertures 13 for a fixed proportion of their lengths. In FIG. 7 the apertures 13 and the lens boundaries 14 are regular hexagons whose sides are in the proportion of $$\sqrt{3} : 1$$

and whose areas are therefore in the proportion of 3:1. It will be seen that any horizontal line 15, drawn across the face of the sign, will coincide with the apertures 13 for one third of its length. Because of the persistence of vision on the retina of the eye, the image seen by a viewer travelling horizontally with respect to the sign, at a speed of the order of 40 columns of elements per second, appears to be stable and uniformly illuminated. Furthermore the resolution of the observed image is enhanced when the effective areas of the individual lenses are decreased by the diaphragm.

Figure 8:
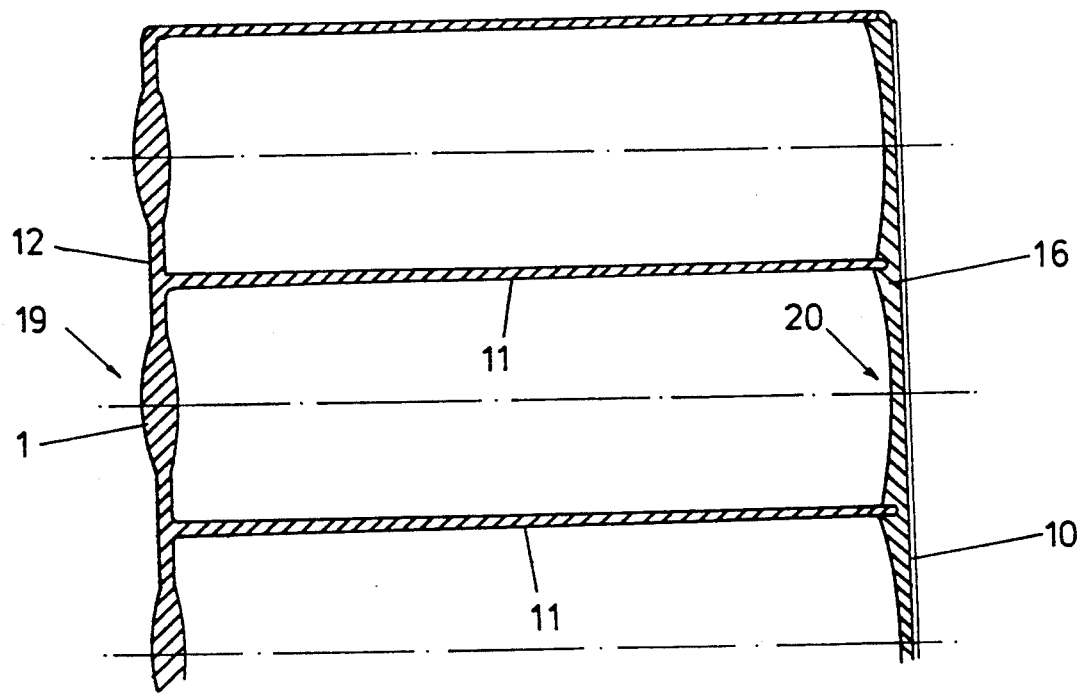
FIG. 8 is a section through a fourth sign in accordance with the present invention.

FIG. 8 illustrates a modular method of constructing a sign according to the invention. Each module consists of a convenient number of elements integrally formed in a tessellar box-like construction comprising two mating components manufactured in a refracting medium such as clear acrylic plastic. The modules tessellate so that they can be assembled into a transparent facia to form a continuous assembly of any required size. The front component 19 of the module comprises the first lenses 1, diaphragm 12 and partitioning 11 of the constituent elements, the said diaphragm and partitioning being coated with an opaque medium. Only the functional areas of the first lenses need be incorporated in the front component 19. The rear component 20 comprises the plano-concave second lenses 16, and its rear flat surface incorporates means, such as spigots and fixings, to support and positively locate the object sheet 10. A source of illumination (not shown) is included in the sign.

Figure 9A:
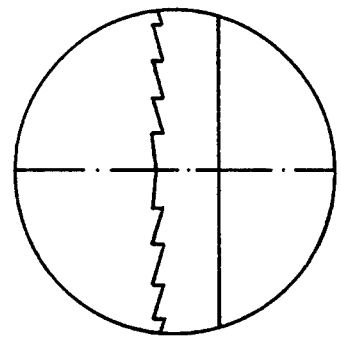
FIG. 9 is a section through a rear portion of a fifth sign in accordance with the present invention, and FIGS. 10, 11 and 12 diagrammatically illustrate the theoretical principles of the present invention.
Figure 9:
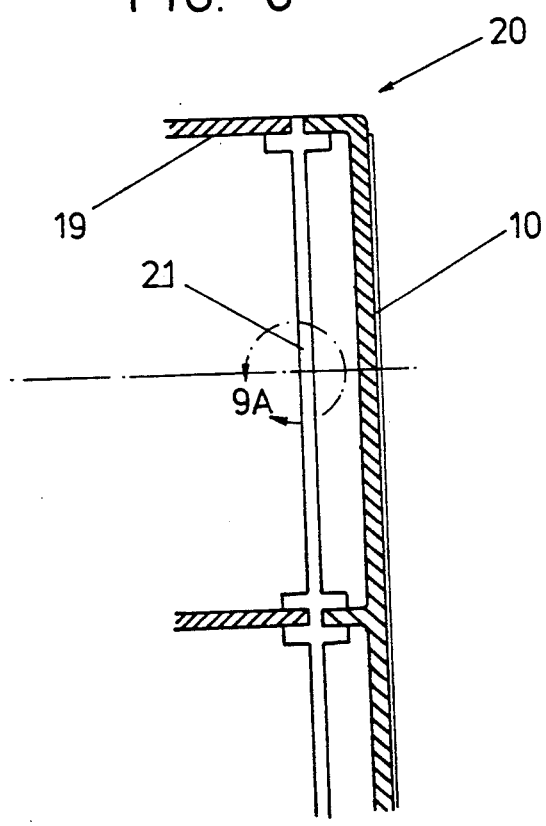

A variant of this modular construction in which the plano-concave second lenses 16 are replaced by fresnel lenses of negative power is shown in FIG. 9. The lenses are formed in a continuous sheet 21 interposed, and positively located between, the front component 19 and the rear component 20 with its fresnel grooves facing the front component 19. This rear component 20 consists mainly of a flat transparent sheet of constant thickness on which the optical sheet 10 is supported and positively located.

Figure 10:
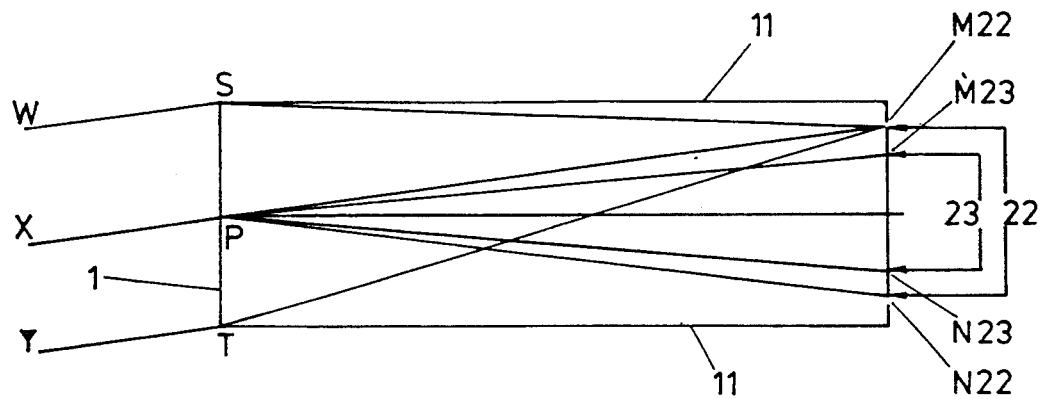
Figure 11:
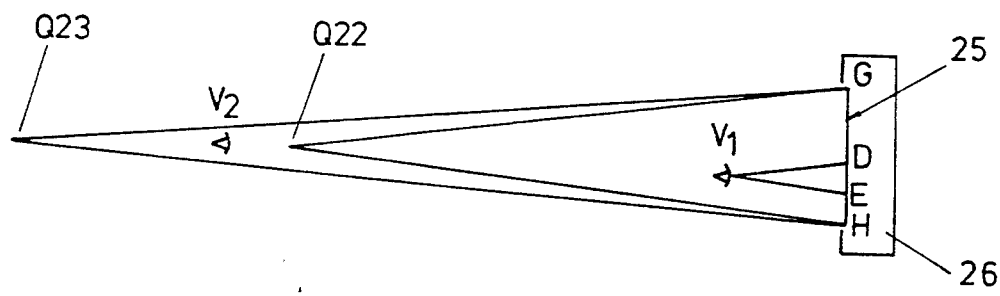
Figure 12:
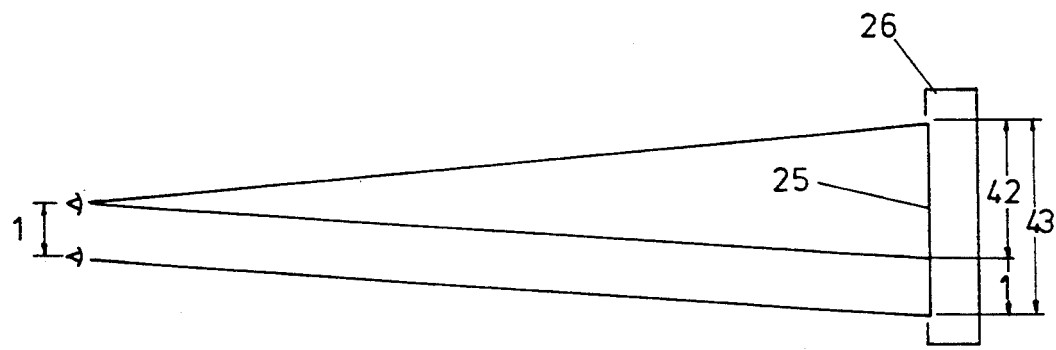

FIGS. 10 to 12 show the relationship between the design parameters of an individual element forming part of the functional assembly of the sign, and the performance of the complete sign. FIG. 10 shows a vertical section through a single element, while FIG. 11 shows an end view of the complete sign similarly orientated and drawn to a much smaller scale.

In the element shown in FIG. 10, an optical object, extending from $M_{22}$ to $N_{22}$ is positioned in the focal plane of lens 1, the element being optically segregated from adjacent elements by partitioning 11. For clarity the second lens at the rear of the element is omitted; in the following description, the terms focal plane and optical object refer to the virtual image of the optical object produced by the second lens. Similarly the lens 1 is assumed to be a thin aspheric fresnel lens of positive power with an optical centre P and a back focal length PF where F is the point of intersection between the element axis and the focal plane. Rays radiating from any point on the optical object and passing through lens 1 are assumed to emerge parallel from the front of the sign.

For comparison two alternative optical objects 22 and 23 are identified in the focal plane. Object 22 extends from $M_{22}$ to $N_{22}$ and object 23 extends from $M_{23}$ to $N_{23}$. Thus the ray $M_{22}P$ passes through the upper extremity $M_{22}$ of object 22 and the lens centre P and then emerges without refraction as PX. Rays $M_{22}S$ and $M_{22}T$ pass through the upper and lower extremities of the lens and emerge after refraction as rays SW and TY respectively, both parallel to PX. Similar parallel rays can be drawn for any point on the optical object.

In FIG. 11 the complete sign 26 is shown in which the facia 25 represents a tessellated array of the first lenses of the elements. The points P of all these aspheric lenses lie in this plane. A vertical section through the zone in which object 22 is visible, hereinafter called 'viewing zone 22', is delineated by drawing $GQ_{22}$ parallel to line $M_{22}P$ and $HQ_{22}$ parallel to $N_{22}P$. $M_{22}PN_{22}$ and $GQ_{22}H$ are similar triangles and $GQ_{22}H$ is a vertical section through viewing zone 22. Any viewer whose pupils lie within this zone can observe a complete image of optical object 22. By way of example, the image of optical object 22 is seen by a viewer V1 through part of the facia DE where $DV_1$ is drawn parallel to $GQ_{22}$ and $EV_1$ is drawn parallel to $HQ_{22}$.

Similarly in FIG. 10 the lesser object 23 occupies a part $M_{23}N_{23}$ of the optical object plane. In FIG. 11 viewing zone 23 is delineated by drawing $GQ_{23}$ parallel to $M_{23}P$ and $HQ_{23}$ parallel to $N_{23}P$, $GQ_{23}H$ being a vertical section through the zone. It follows that a viewer $V_2$, whose pupils are within viewing zone 23 but are outside of viewing zone 22, can observe a complete image of optical object 23 but only a partial image of optical object 22.

It will be seen that for a given optical object, the relationship between the maximum viewing distance, facia height, lens focal length, and optical object height is expressed by the formula:

$$\frac{\text{basic facia height}}{\text{maximum viewing distance}} = \frac{\text{optical object height}}{\text{focal length}}$$

The basic facia height necessary to achieve a given maximum viewing distance can be calculated as follows:

Given: maximum viewing distance 3200 mm
focal length 125 mm
optical height 50 mm $$\text{basic facia height} = \frac{3200 \times 50}{125} \text{ mm}$$
$$= 1280 \text{ mm}$$

In practice an allowance is made for eye-level variation as shown in FIG. 12. To allow for eye-level variation 1 at the maximum viewing distance this dimension is added to 42, the basic facia height, to give a total height 43.

In the foregoing example the basic facia height is 1280 mm. If an eye level variation of 220 mm is required at the maximum viewing distance, this dimension must be added to the basic facia height giving a total height of 1500 mm.

In most applications in which the optical object is to be observed by a viewer moving horizontally with respect to the sign, the viewing distance is limited by the height of the facia. The duration of the observed image is determined by the time taken for the viewer's pupils to pass horizontally through the viewing zone, which in turn depends upon the horizontal length of the sign and the viewer's passing speed.

I claim:

1. A sign for presenting information to an observer moving with respect thereto, charactrised in that the sign comprises a plurality of elements linearly disposed with respect to one another, each of which elements comprises first and second coaxial lenses and an optical object consisting of a representation of the information which the sign is to present and in registry with said first and second lenses, the optical object of each element being substantially identical and said first lens constituting the external surface of the sign, wherein the virtual image of the optical object formed by said second lens of each element lies in the focal surface of the first lens of the element such that light rays emanating from any point on the optical object through the second lens emerge in a substantially parallel manner from the first lens.

2. A sign as claimed in claim 1 wherein the fist lens of each element is an aspheric hexagonal lens.

3. A sign as claimed in claim 2 wherein the second lens of each element is a plano-concave lens, the plane surface of which is most remote from the first lens of the element and wherein the optical object lies directly on said plane surface.

4. A sign as claimed in claim 2 wherein the second lens of each element is a fresnel lens of negative power and having fresnel grooves formed in its surface nearer to the first lens of the element and wherein the optical object of each element is mounted at a fixed distance from said second lens in the direction away from said first lens.

5. A sign as claimed in claim 2 wherein the first lens of each element is partially covered by an opaque diaphragm defining an aperture coaxial with the lens.

6. A sign as claimed in claim 5 wherein each aperture is a hexagonal aperture which is displaced by 30° with respect to the first lens, about their common axis.

7. A sign as claimed in claim 1 wherein the first lens of each element is a fresnel lens.

8. A sign as claimed in claim 1 wherein the sign includes a light source by means of which the optical objects are illuminated.

9. A sign as claimed in claim 1 wherein the elements comprise a tessellated array.

10. A sign as claimed in claim 9 wherein opaque partitions are located between adjacent elements.

* * * * *

UNITED STATES PATENT AND TRADEMARK OFFICE
CERTIFICATE OF CORRECTION

PATENT NO. : 5,165,186

DATED : November 24, 1992

INVENTOR(S) : Edwin J. Smith

It is certified that error appears in the above-identified patent and that said Letters Patent is hereby corrected as shown below:

Column 3, line 8, "transversel" should be --transversely--

Figure 5A:
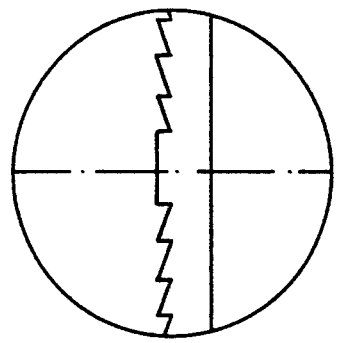

Column 2, line 26, after "invention," insert --FIG 5A is a detailed view of the area designated 5A in FIG 5,--

Column 2, line 33, after "invention," insert --FIG 9A is a detailed view of the area designated as 9A in FIG 9,--

Column 3, line 49, delete "1." and insert therefor --1, as shown in FIG 5A.--

Column 4, line 45, after "9" insert --and in more detail in FIG 9A--

Signed and Sealed this

Nineteenth Day of April, 1994

BRUCE LEHMAN

Attest:

Attesting Officer

Commissioner of Patents and Trademarks